US006964310B2

(12) United States Patent
Hasegawa

(10) Patent No.: US 6,964,310 B2
(45) Date of Patent: Nov. 15, 2005

(54) MULTI-WHEEL-DRIVING VEHICLE

(76) Inventor: Toshiyuki Hasegawa, 2-18-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 11/077,535

(22) Filed: Mar. 11, 2005

(65) Prior Publication Data

US 2005/0155800 A1    Jul. 21, 2005

Related U.S. Application Data

(63) Continuation of application No. 09/741,191, filed on Dec. 21, 2000, now Pat. No. 6,877,573.

(30) Foreign Application Priority Data

Dec. 21, 1999  (JP)  ................................. 11-362706

(51) Int. Cl.[7] ............................................. B62D 61/10
(52) U.S. Cl. ..................... 180/24.09; 180/22; 180/53.6
(58) Field of Search ............................. 180/22, 24.08, 180/24.09, 24.11, 24.12, 53.6–53.62, 53.7

(56) References Cited

U.S. PATENT DOCUMENTS

| | | | | |
|---|---|---|---|---|
| 4,768,398 A | * | 9/1988 | Greenwood ................. | 475/216 |
| 4,809,796 A | * | 3/1989 | Yamaoka et al. .......... | 180/6.48 |
| 5,679,085 A | * | 10/1997 | Fredriksen et al. ........... | 475/76 |
| 5,720,687 A | * | 2/1998 | Bennett ....................... | 475/214 |
| 6,029,542 A | * | 2/2000 | Wontner .................... | 74/606 R |
| 6,182,784 B1 | * | 2/2001 | Pestotnik .................... | 180/376 |
| 6,868,932 B1 | * | 3/2005 | Davis et al. ................ | 180/292 |

* cited by examiner

*Primary Examiner*—Lesley D. Morris
*Assistant Examiner*—L. Lum
(74) *Attorney, Agent, or Firm*—Sterne, Kessler, Goldstein & Fox, P.L.L.C.

(57) ABSTRACT

A multi-wheel-driving vehicle including at least three parallel axles each of which is provided on both ends thereof with respective drive wheels and including power dividing means for permitting the rotary speed among the axles, is improved in its effect of braking so that the braking force of fewer brakes is effectively transmitted to all drive wheels of a vehicle according to a simple braking operation by a driver. The power dividing means, for example, a differential gear unit, includes an input member and a pair of output members, like differential side gears, each of which interlocks with at least one of the axles so as to differentially share a driving force received by the input member between the pair of output members. The multi-wheel-driving vehicle comprises a brake provided on one of the at least three axles, and locking means for locking the input member and the pair of output members together, so that when a driver operates a brake-operating tool for braking, the locking means is automatically operated to lock the input member and the pair of output members together.

4 Claims, 15 Drawing Sheets

MULTI-WHEEL-DRIVING VEHICLE

CROSS-REFERENCE TO RELATED APPLICATIONS

This application is a continuation of U.S. application Ser. No. 09/741,191, filed Dec. 21, 2000, now U.S. Pat. No. 6,877,573, which is incorporated herein in its entirety by reference.

STATEMENT REGARDING FEDERALLY-SPONSORED RESEARCH AND DEVELOPMENT

Not applicable

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The present invention relates to a multi-wheel-driving vehicle provided with not less than six drive wheels. More particularly, the present invention relates to a technique for improving the braking capacity of the multi-wheel-driving vehicle, as well as compactness and cost savings in its construction.

2. Background Art

Conventionally, there is a multi-wheel-driving vehicle having three or more axles disposed in parallel, each of which is provided at its left and right ends with respective drive wheels. Generally, each axle is divided into left and right halves which are differentially connected with each other through a differential.

U.S. Pat. No. 4,050,534 discloses a power transmission system for such a multi-wheel-driving vehicle wherein engine power is distributed among three axles as follows. The torque output from a transmission is firstly transmitted to a tandem axle mechanism, i.e., a center differential which differentially connects a pair of coaxial first and second transmission shafts. The tandem axle mechanism distributes a part of the torque to the frontmost (steerable) axle and the rearmost axle through the first transmission shaft and the remainder of the torque to the middle axle (second rear axle) through the second transmission shaft, thereby nicely balancing the torque among the three axles. However, in such a cited conventional power distribution structure, the frontmost axle for steerable front drive wheels is drivingly synchronized with the rearmost axle for unsteerable rear drive wheels, so that the driving of the front wheels is restricted while turning by the driving of the rear wheels, thereby hindering a smooth steering of the vehicle. For avoiding such a problem, it is effective to have the axle of the steerable wheels drivingly differentially connected with the other axles.

Furthermore, this cited document does not disclose an arrangement of brakes. In the cited art, if only the middle axle of the three is provided thereon with a brake, the tandem axle mechanism prevents the braking force applied thereon from being effectively transmitted to the frontmost and rearmost axles. On the other hand, if a brake is just provided on either the front axle or the rearmost axle, the braking force applied on the axle is transmitted to the other of the front or rearmost axle because the two axles interlock with each other through the first transmission shaft. However, the braking force is not effectively transmitted to the middle axle interlocking with the second transmission shaft. Thus, to effectively stop the vehicle, the middle axle and at least one of the frontmost and rearmost axles need respective brakes, whereby at least two brakes are necessary.

Furthermore, as mentioned above, each axle is generally divided into two halves differentially connected with each other. If only one of the halves is provided thereon with a brake, the braking force cannot be effectively transmitted to the other half. If the first and second transmission shafts of the tandem axle mechanism are locked together and if the halves of each axle are locked together, a braking force generated by fewer brakes can be effectively transmitted to all axles, thereby improving compactness of the vehicle and increasing cost-savings. It is preferable that such differential-locking operations are automatically performed due to the driver's braking operation so as to facilitate the driver's work.

BRIEF SUMMARY OF THE INVENTION

A first object of the present invention is to provide a multi-wheel-driving vehicle including three or more axles arranged in parallel along a longitudinal axis of the vehicle. Each of the axles is provided on each end thereof with a respective drive wheel. One of the three or more axles is a steering axle provided with steerable drive wheels, and includes power dividing means for permitting rotary speed among the axles, wherein the steering axle is drivingly differentially connected with the other axles so that the steerable drive wheels can be driven while receiving nicely distributed power.

To achieve the first object, the vehicle is provided with a pair of transmission members like coaxial shafts between which a first power dividing means, such as a one-way clutch, is interposed. The steering axle synchronously interlocks with one of the transmission members, and at least another axle, preferably, all the axles other than the steering axle interlock with the other transmission member. Power is transmitted through the first power dividing means between both the transmission members while the first power dividing means allows a difference of rotary speed between the transmission members.

Alternatively, the vehicle is provided with a second power dividing means, such as a differential, comprising an input member and a pair of output members (like coaxial shafts) provided thereon with respective differential side gears. Each of the output members synchronously interlocks with at least one axle. The steering axle synchronously interlocks with either the input member or one of the output members of the second power dividing means. Preferably, only the steering axle of the three or more axles synchronously interlocks with one of the output members. At least one axle other than the steering axle interlocks with the other output member. The remaining axle or axles interlock with either the input member or the other output member.

Furthermore, three or more transaxle devices may be arranged in tandem along the longitudinal axis of the vehicle so that each of the transaxle devices includes input means and each of the three or more axles serves as output means. One of the three or more transaxle devices is a main transaxle device whose input means receives power from a prime mover prior to the other transaxle devices. Another of the transaxle devices is a steering transaxle device whose axle is the steering axle. Preferably, the steering transaxle device is separate from the main transaxle device.

In this case, a continuous variable transmission may be interposed between the prime mover and the input means of the main transaxle device. If the input means is provided on one side of the main transaxle device, a power-take-out portion of the main transaxle device for transmitting power to another transaxle device may be provided on another opposite side of the main transaxle device.

If the power dividing means is the above-mentioned first power dividing means interposed between a pair of first and second transmission members for transmitting power from the first transmission member to the second transmission member, the input means of the main transaxle device synchronously interlocks with the first transmission member, and at least one input means of the other transaxle devices synchronously interlocks with the second transmission member. Preferably, only the axle of the steering transaxle device synchronously interlocks with the second transmission member, and all the axles of the other transaxle devices synchronously interlock with the first transmission member.

If the power dividing means is the second power dividing means including the input member and the pair of output members, power taken from the main transaxle device is transmitted into the input member of the second power dividing means. Each of all the input member and the output members of the second power dividing means synchronously interlocks with at least one of all the axles of the three or more transaxle devices. Alternatively, all the axles of the three or more transaxle devices may distributively synchronously interlock with the pair of output members of the second power dividing means so that at least one axle synchronously interlocks with each of the output members of the second power dividing means. Preferably, only the steering axle synchronously interlocks with one of the output members of the second power dividing means.

A second object of the present invention is to provide the multi-wheel-driving vehicle as mentioned above with a braking force, supplied by fewer brakes, that is effectively transmitted to all drive wheels of a vehicle in response to a simple braking operation by a driver, thereby enhancing braking effectiveness and reducing the cost of providing brakes.

To achieve the second object, a brake such as a wet-type is provided on one of the three or more axles. In the case that the three or more axles serve as output means of respective transaxle device including input means, a brake is provided on a transmission system or the axle in the main transaxle device. If the first power dividing means is utilized, locking means is provided for locking the pair of transmission members together, so that when a driver operates a manual brake-operating tool for braking, the locking means is automatically operated to lock the pair of transmission members together.

If the second power dividing means is utilized, locking means is provided for locking the input member and the pair of output members together, so that when the driver operates the brake-operating tool for braking, the locking means is automatically operated to lock the input member and the pair of output members together.

Additionally, if the axle provided thereon with the brake is divided into two halves differentially connected with each other through a differential and the brake is provided on one of the halves, differential-locking means is provided for locking the two halves together. Thus, when a driver operates the brake-operating tool for braking, the differential-locking means is automatically operated to lock the halves together.

Other and further objects of the present invention will appear more fully from the following description.

BRIEF DESCRIPTION OF THE DRAWINGS/FIGURES

DETAILED DESCRIPTION OF THE INVENTION

Figure 1:
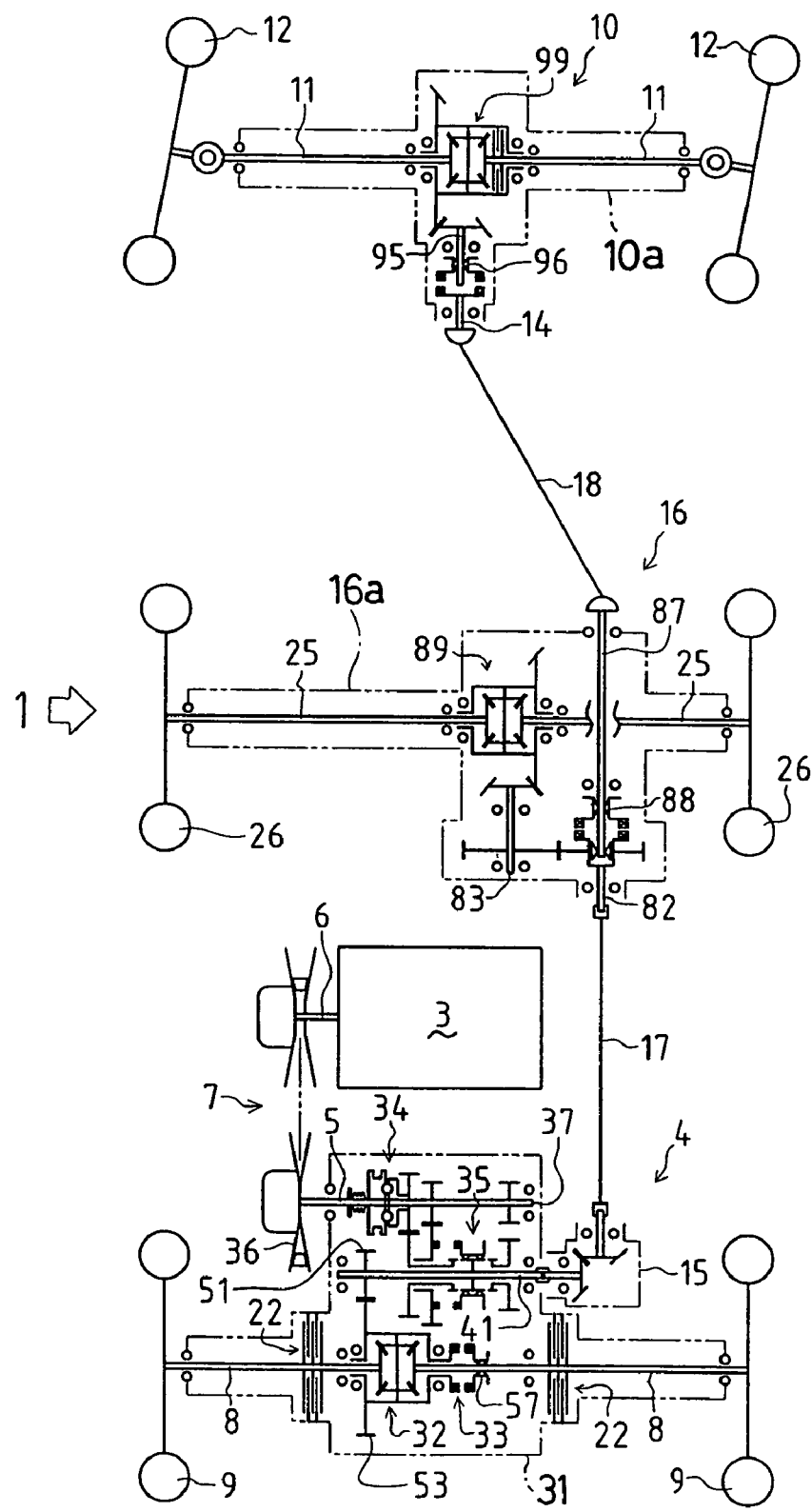
FIG. 1 is a schematic diagram of a driving transmission system of a multi-wheel-driving vehicle including front, middle and rear transaxle devices disposed in tandem along a longitudinal axis of the vehicle according to a first embodiment of the present invention.

Referring to FIG. 1, a multi-wheel-driving vehicle 1 comprises a front transaxle device 10 which serves as a steering transaxle device disposed at its front portion, a middle transaxle device 16 disposed at its longitudinally intermediate portion, and a rear transaxle device 4 disposed at its rear portion. Rear transaxle device 4 which serves as a main transaxle device includes a pair of left and right rear axles 8 serving as main axles which support at their outer ends respective rear wheels 9. Middle transaxle device 16 includes a pair of left and right middle axles 25 serving as second axles which support at their outer ends respective middle wheels 26. Front transaxle device 10 includes a pair of left and right front axles 11 serving as steering axles which support at their outer ends respective steerable front wheels 12.

The power of an engine 3, which serves as a prime mover mounted on a body of multi-wheel-driving vehicle 1, is transmitted to rear axles 8 of rear transaxle device 4 so as to drive rear wheels 9 forward and backward, thereby making vehicle 1 travel forward and backward. Also, a four-wheel-drive mode in which middle wheels 26 are driven in addition to rear wheels 9 or a six-wheel-drive mode in which front wheels 12 are still additionally driven can be selectively established by a driver's operation.

A transmission system for transmitting power from engine 3 to rear axles 9 comprises a continuous variable transmission (hereinafter, "CVT") 7 disposed outside rear transaxle device 4 and a speed-changing gear transmission 35 disposed in rear transaxle device 4. CVT 7 is interposed between an output shaft 6 of engine 3 and an input shaft 5 of speed-changing gear transmission 35. Input shaft 5 projects laterally outwardly from one of left and right sides of a rear axle housing 31 of rear transaxle device 4. A follower split pulley 36 is provided on input shaft 5 outside housing 31 for constituting CVT 7.

In this embodiment, CVT 7 is a belt-type CVT constituted by split pulleys and a belt wherein the speed reduction ratio is automatically steplessly reduced according to the increase of rotary speed of engine 3. However, it may be replaced with a hydrostatic stepless transmission including a hydraulic pump and a hydraulic motor, for example, which is manually or automatically adjusted in its output rotary speed. Any transmission mechanism may be interposed between output shaft 6 and input shaft 5 if it agrees with the requirements.

Figure 2:
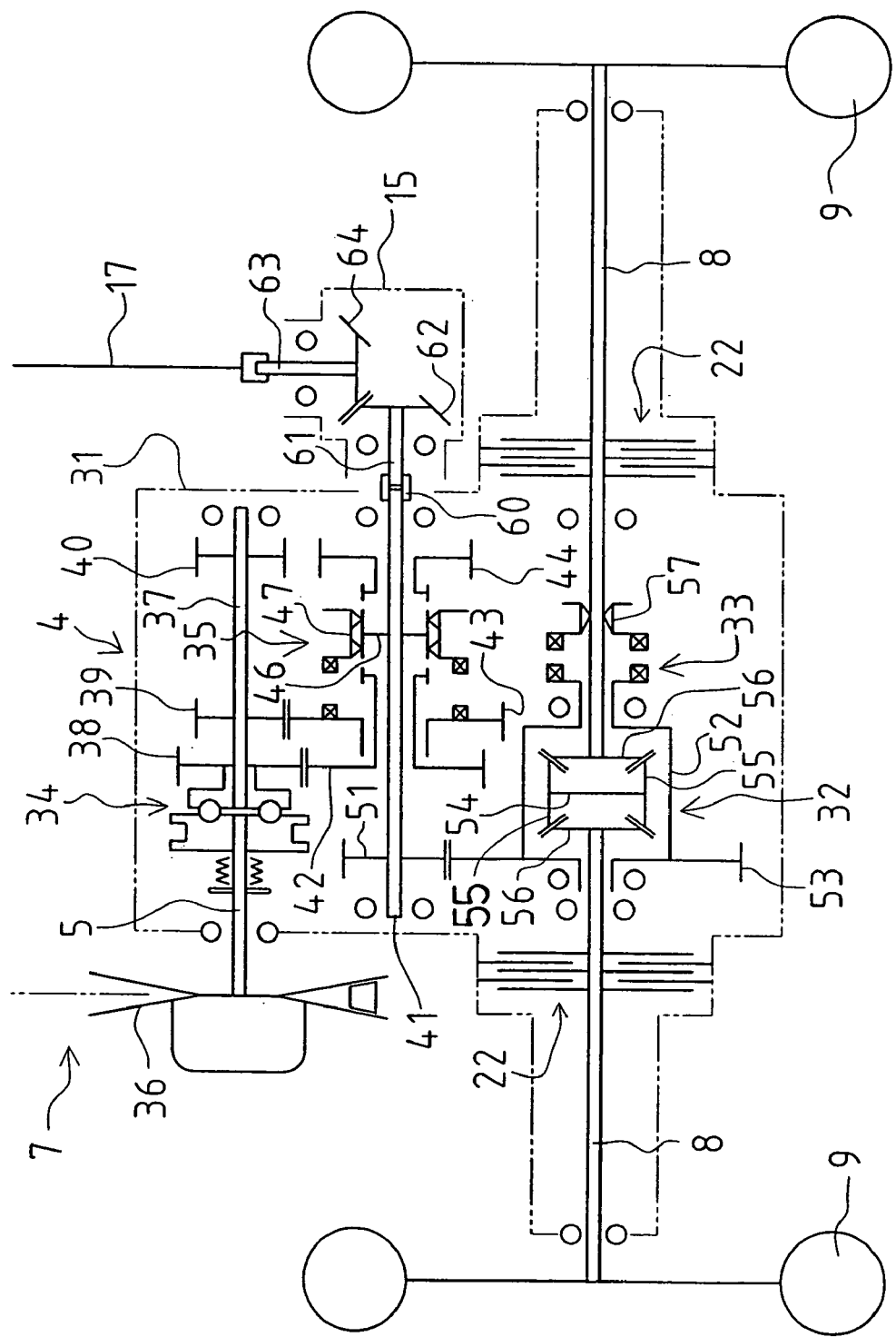
FIG. 2 is a schematic diagram of the rear transaxle device of the same multi-wheel-driving vehicle.
Figure 3:
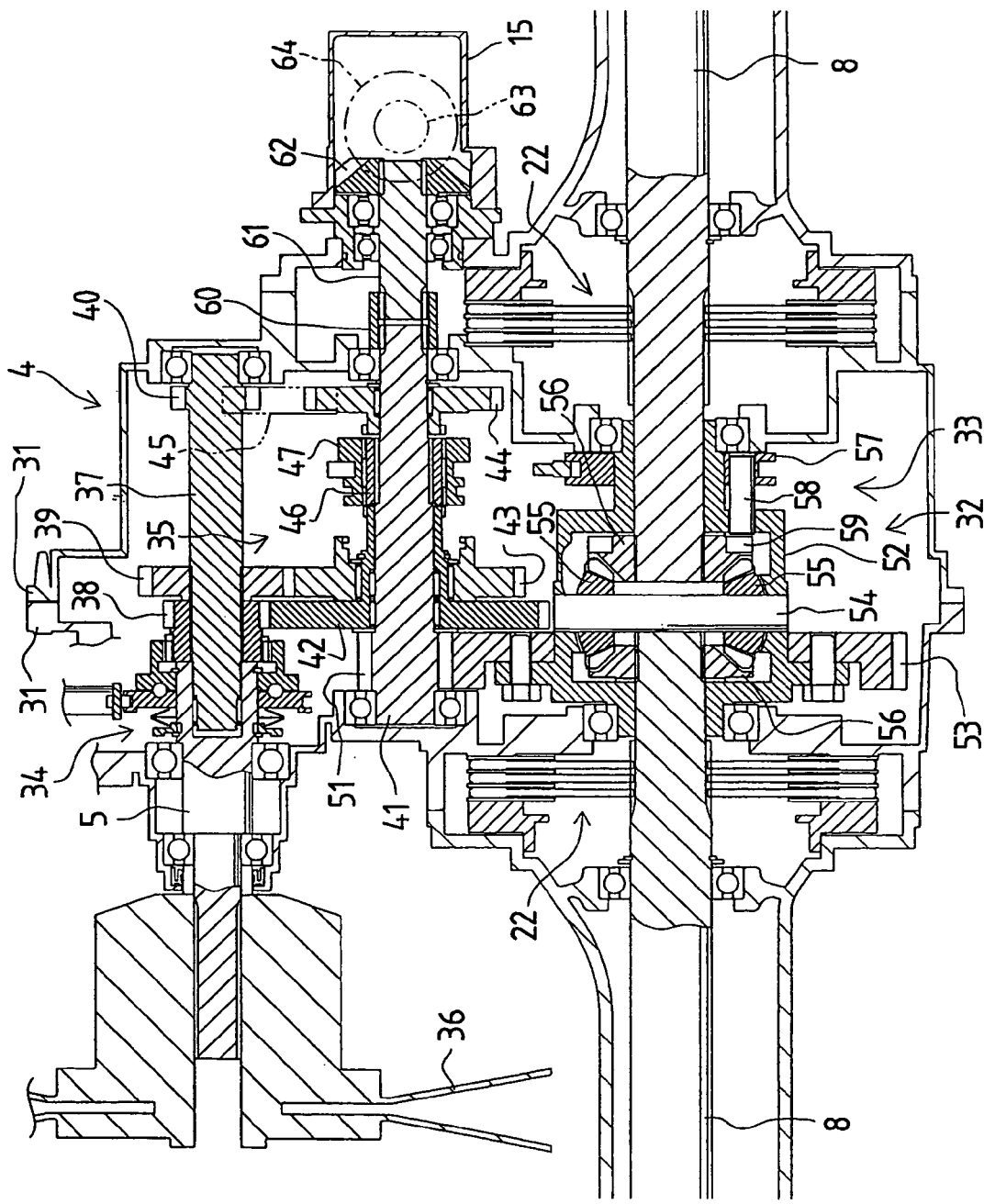
FIG. 3 is a sectional developed view of the interior of the rear transaxle device.

Description will be given on rear transaxle device 4 with reference to FIGS. 2 and 3. Rear axle housing 31 of rear transaxle device 4 is made of a pair of left and right housing halves joined together. In housing 31 are laterally disposed a drive shaft 37, a counter shaft 41 and coaxial rear axles 8 in parallel to one another. Drive shaft 37 is coaxially connected to input shaft 5 through a torque sensor 34. Torque sensor 34 detects various type resistances such as rolling resistance, air resistance, acceleration resistance and grade resistance generated from each of wheels 12, 26 and 9 or the like, and outputs detection signals into a controller (not shown). The controller adjusts the degree of opening of a throttle valve of engine 3 correspondingly to the detection signals, thereby serving as a torque sensing governor.

In housing 31 is interposed a speed-changing gear transmission 33 between drive shaft 37 and counter shaft 41. Drive shaft 37 is fixedly provided therearound with a high-speed drive gear 38 and a low-speed drive gear 39, and notched on its periphery so as to integrally form a reverse drive gear 40. A high-speed follower gear 42 and a reverse follower gear 44 are relatively rotatably provided around counter shaft 41. High-speed follower gear 42 directly engages with high-speed drive gear 38. Reverse follower gear 44 engages with reverse drive gear 40 through an idle gear 45. A low-speed follower gear 43 is relatively rotatably provided around a boss portion of high-speed follower gear 42 so as to directly engage with low-speed drive gear 39.

A spline hub 46 is fixedly disposed around counter shaft 41 between low-speed follower gear 43 and reverse follower gear 44. A gear-changing clutch slider 47 is axially slidably but not relatively rotatably disposed around spline hub 46. Gear-changing clutch slider 47 is axially slidden along counter shaft 41 so as to engage with one of gears 42, 43 and 44 provided on counter shaft 41, thereby selectively bringing counter shaft 41 into a high-speed regularly directed rotation, a low-speed regularly directed rotation or a reversely directed rotation. Also, gear-changing clutch slider 47 can be located at its neutral position where it does not engage with any of gears 42, 43 and 44.

Vehicle 1 is provided with a manually operable speed-changing tool (not shown) such as a lever interlocking with gear-changing clutch slider 47. The speed-changing tool is shiftable among a high-speed forward driving position, a low-speed forward driving position, a reverse driving position and a neutral position, thereby sliding gear-changing clutch slider 47 correspondingly.

Counter shaft 41 is notched on its periphery so as to form an output gear 51 adjacent to one of its ends. Output gear 51 constantly engages with a ring gear 53 of a main-axle-differential 32 which is disposed in rear axle housing 31 for differentially connecting left and right coaxial rear axles 8 with each other.

Main-axle differential 32 will be described. A hollow differential casing 52 is disposed coaxially with rear axles 8 and rotatably supported by housing 31. Ring gear 53 serving as an input gear of the main-axle-differential 32 is fixed around differential casing 52 so as to engage with output gear 51. In differential casing 52, a pinion shaft 54 is disposed between facing inner ends of rear axles 8 and perpendicularly to rear axles 8, and is supported by differential casing 52 so as to be rotatable together with differential casing 52 centering axes of rear axles 8. Pinion shaft 54 is rotatably provided thereon with a pair of pinions 55 adjacent to differential casing 52 into which each of the ends of pinion shaft 54 is engaged. In differential casing 52, differential side gears 56 are fixedly disposed on respective rear axles 8 symmetrically with respect to pinion shaft 54 so as to engage with both pinions 55.

A main-axle-differential locking mechanism 33 for locking main-axle-differential 32 together with both rear axles 8 will be described. The portion of differential casing 52 laterally opposite to ring gear 53 is formed into a boss. A main-axle-differential locking slider 57 is axially slidably disposed around the boss portion of differential casing 52. At least one lock pin 58 is fixed at one end thereof to main-axle-differential locking slider 57 and projects at the other end thereof into differential casing 52 in parallel to rear axles 8. The differential side gear 56 disposed adjacent to main-axle-differential locking slider 57 is provided at its surface directed toward main-axle-differential locking slider 57 with a recess 59 into which lock pin 58 can be engaged. When differential-locking slider 52 is slidden along the boss portion of differential casing 52 toward main-axle-differential 32, lock pin 58 is moved together with main-axle differential-locking slider 57 and engaged into recess 59 so as to lock main-axle-differential 32 together with both rear axles 8, thereby making both rear axles 8 rotate at the same rotary speed.

Vehicle 1 is provided with a manually operable differential-locking tool (not shown) such as a lever interlocking with main-axle-differential locking slider 57. The differential-locking tool is switchable between a locking position and an unlocking position, thereby selectively locking or unlocking main-axle-differential 32.

Figure 8:
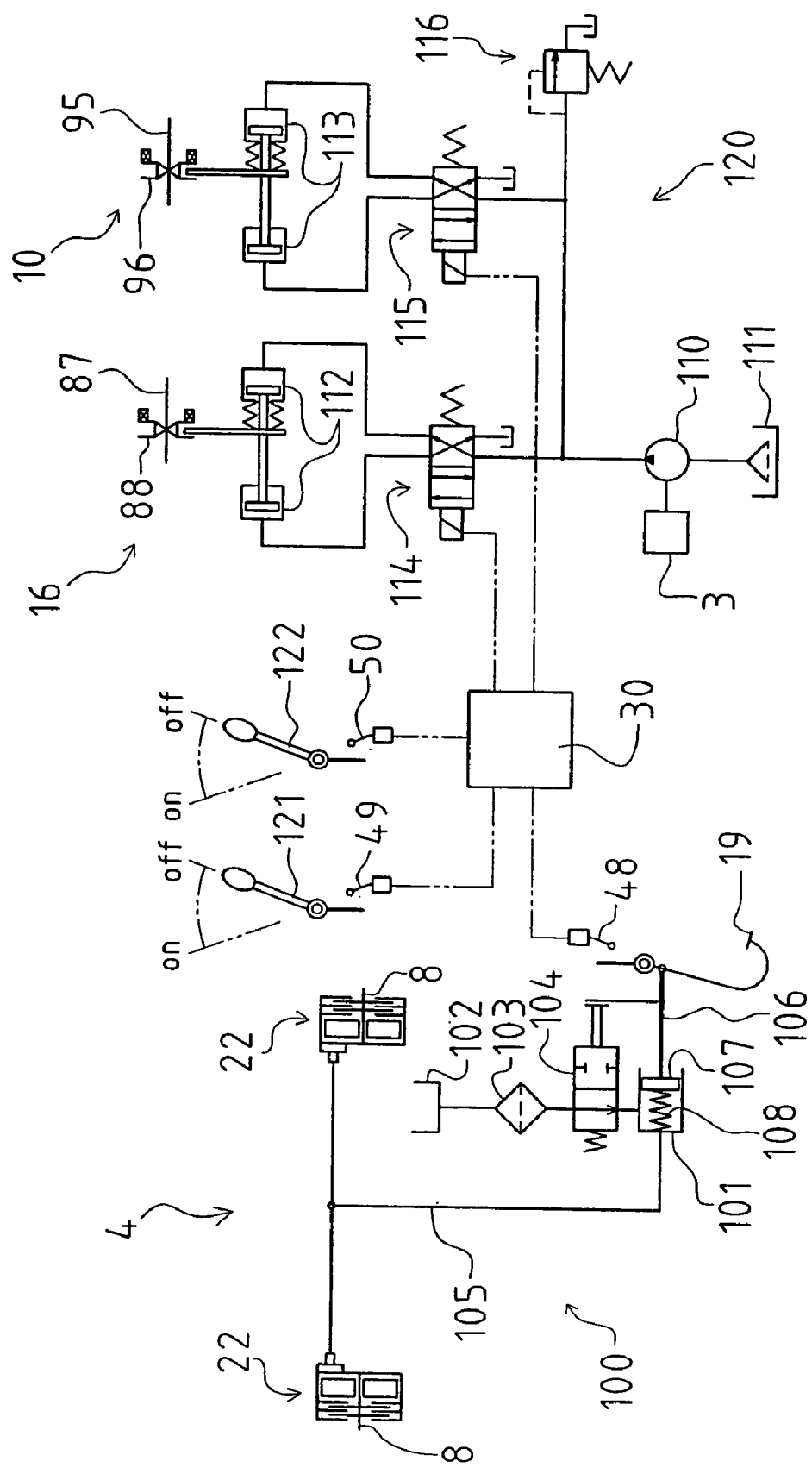
FIG. 8 is a hydraulic and electric circuit diagram of a control system for brakes and clutches in the driving transmission system of the same multi-wheel-driving vehicle.

A hydraulic brake 22 of a wet multi-frictional-disc type is provided on each rear axle 8 in housing 31. As shown in FIG. 8 (as discussed below), vehicle 1 is provided with a brake pedal 19 which is depressed so as to simultaneously apply brake force onto both rear axles 8 through brakes 22.

A PTO casing 15 is fixedly mounted on an outer side surface of rear axle housing 31 in laterally opposite to input shaft 5. In rear axle housing 31, counter shaft 41 is extended at its one end outwardly and coaxially connected to an extension shaft 61 through a coupling 60. Extension shaft 61 projects into PTO casing 15. A first PTO shaft 63 projects forward from PTO casing 15. In PTO casing 15, a bevel gear 62 fixed on extension shaft 61 engages with a bevel gear 64 fixed on first PTO shaft 63.

Figure 4:
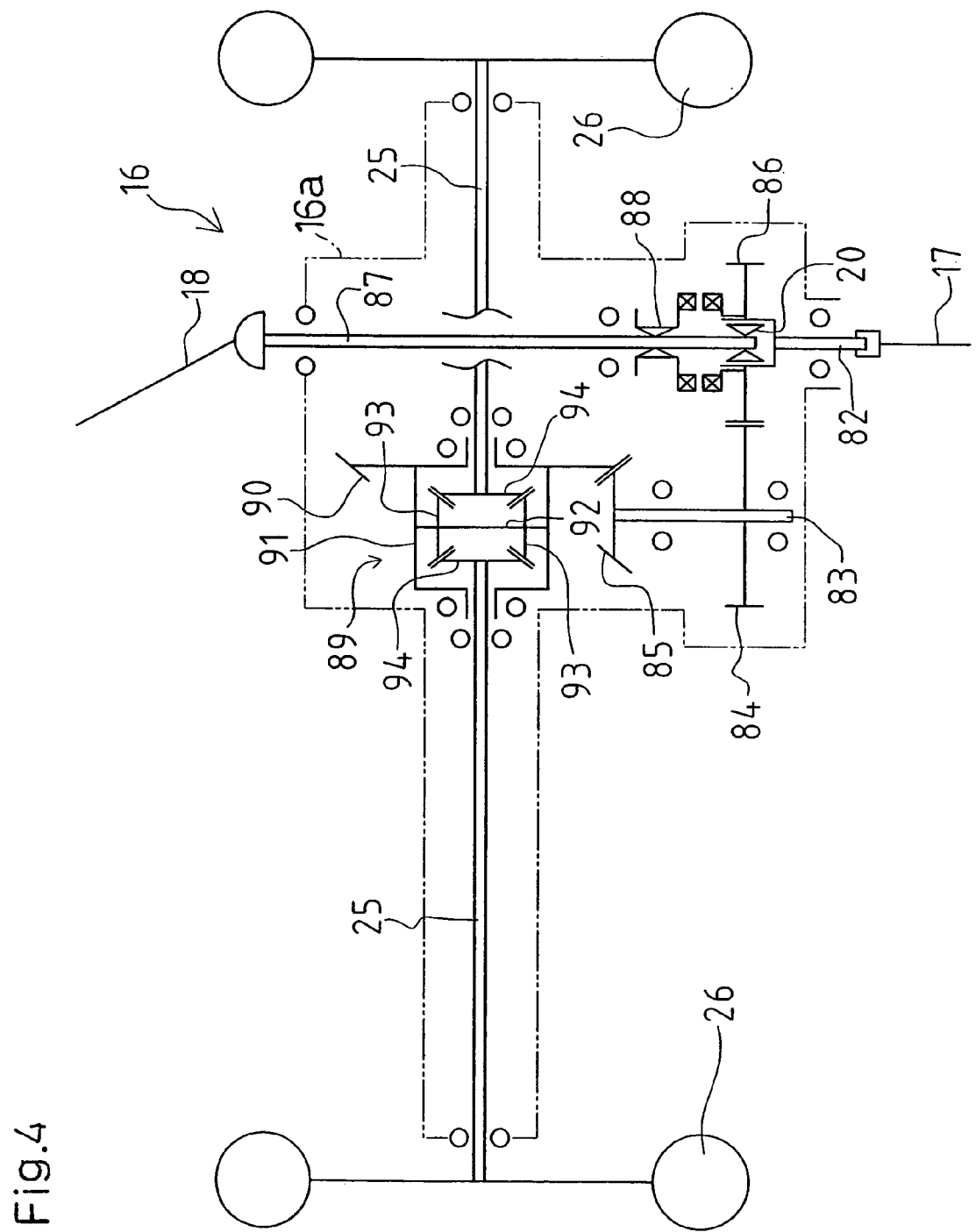
FIG. 4 is a schematic diagram of the middle transaxle device of the same multi-wheel-driving vehicle.
Figure 5:
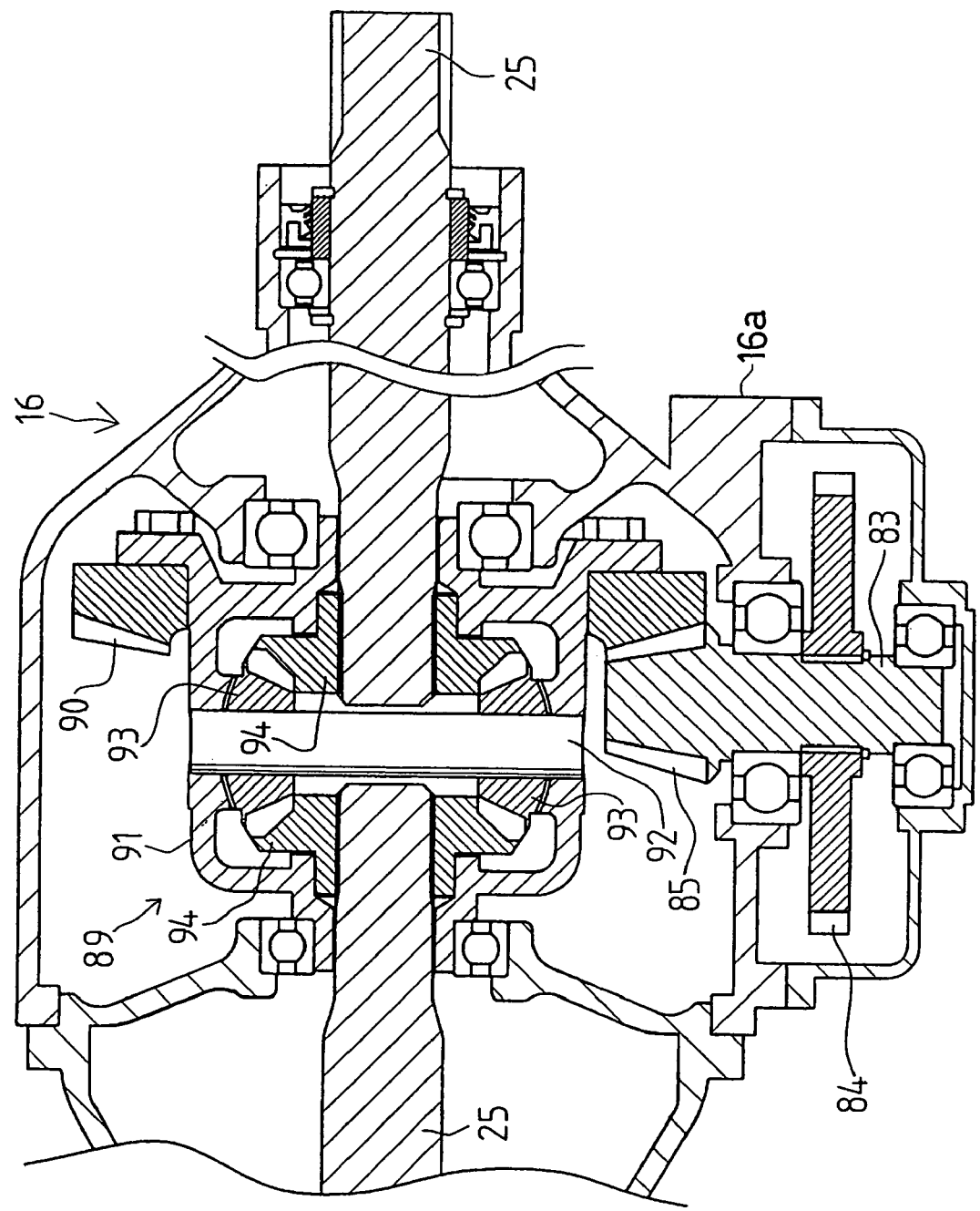
FIG. 5 is a sectional plan view of the interior of the middle transaxle device.
Figure 6:
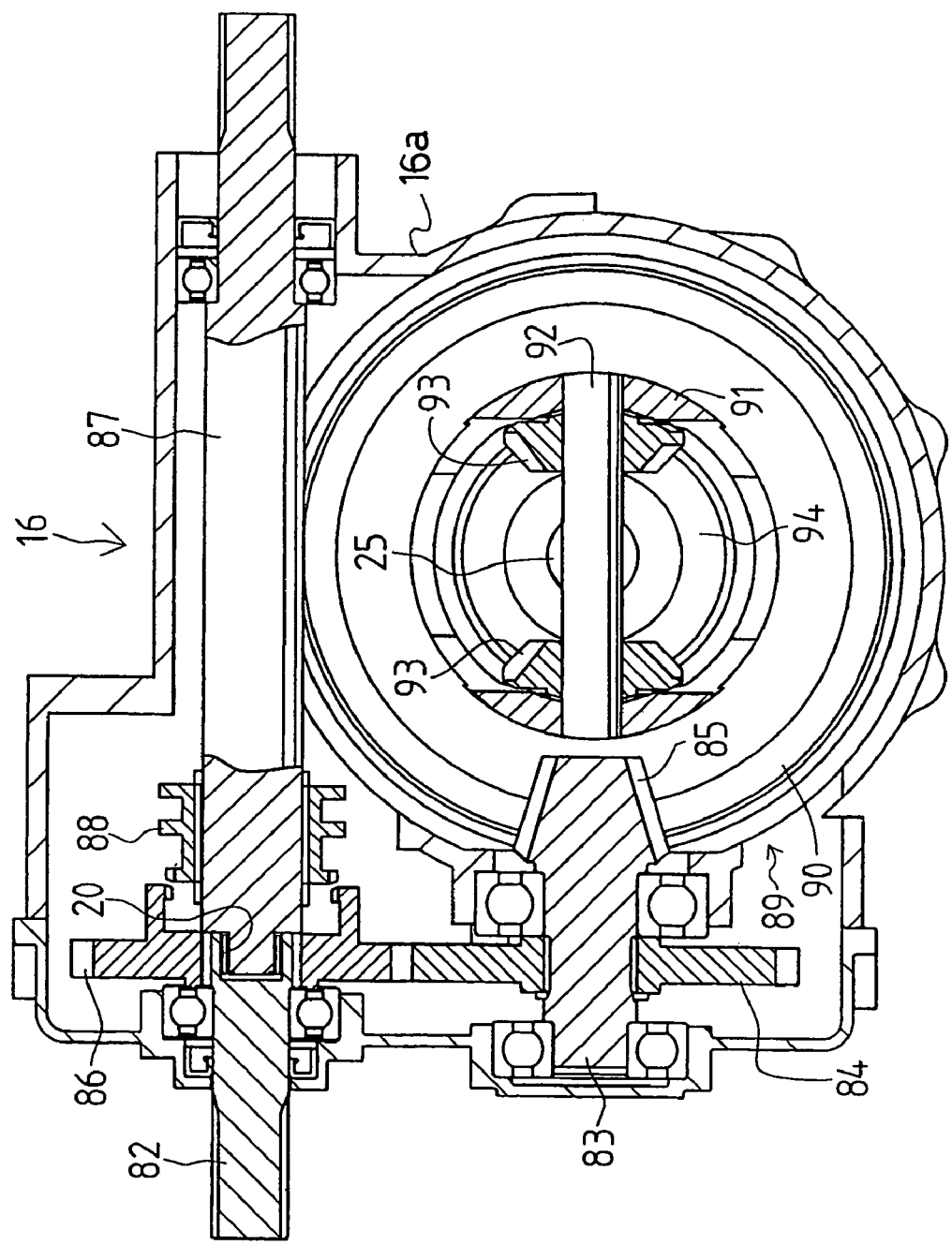
FIG. 6 is a sectional side view of the same.

Description will be given on middle transaxle device 16 with reference to FIGS. 4 through 6. An input shaft 82 is disposed longitudinally of vehicle 1, rotatably supported by a middle axle housing 16a, and projects backward from housing 16a so as to be universally joined with first PTO shaft 63 through a propeller shaft 17. In middle axle housing 16a, a clutch gear 86 is fixedly provided around input shaft 82. A counter shaft 83 is rotatably disposed parallel to input shaft 82 in middle axle housing 16a, and fixedly provided thereon adjacent to its rear end with a counter gear 84 which constantly engages with clutch gear 86. A front end of counter shaft 83 is formed into a bevel gear 85.

Coaxial left and right middle axles 25 are differentially connected with each other through a second-axle-differential 89 in middle axle housing 16a. Second-axle-differential 89 for middle axles 25, similar to main-axle-differential 32 for rear axles 8, comprises a differential casing 91, a pinion shaft 92, a pair of pinions 93 and a pair of differential side gears 94. Differential casing 91 is disposed coaxially with middle axles 25 and rotatably supported by middle axle housing 16a. A bevel gear 90 serving as an input gear of second-axle-differential 89 is fixed around differential casing 91 so as to constantly engage with bevel gear 85. Pinion shaft 92 is disposed between middle axles 25 and perpendicularly to middle axles 25 in differential casing 91 and supported at its opposite ends by differential casing 91. Pinions 93 are rotatably provided around pinion shaft 92 in differential casing 91 so as to be disposed symmetrically with respect to middle axles 25. In differential casing 91 are disposed inner ends of middle axles 25 around which differential side gears 94 are respectively fixed so as to engage with both pinions 93.

A second PTO shaft 87 is disposed in middle axle housing 16a coaxially with input shaft 82 and projects forward therefrom. In middle axle housing 16a, a front end of input shaft 82 is backwardly recessed and a rear end of second PTO shaft 87 is inserted into the recessed front end of input shaft 82. A one-way clutch 20 is interposed between input shaft 82 and second PTO shaft 87. One-way clutch 20 is engaged so as to transmit driving force therebetween only when input shaft 82 is rotated for forward driving of vehicle 1. On the other hand, one-way clutch 20 is disengaged so as to allow a difference in rotary speed between input shaft 82 and second PTO shaft 87, that is, between middle wheels 26 and front wheels 12. A center clutch slider 88 is axially slidably disposed around second PTO shaft 87. A center clutch is constructed between center clutch slider 88 and clutch gear 86 so as to be engaged and disengaged by sliding of center clutch slider 88.

In this embodiment, middle transaxle device 16 including second-axle-differential 89 is constantly drivingly connected with rear transaxle device 4 including main-axle-differential 32. In the case that a front clutch for drivingly connecting front transaxle device 10 to middle transaxle device 16 is engaged, when center clutch slider 88 is slidden backward so as to engage the center clutch, that is, to lock input shaft 82 and second PTO shaft 87 together regardless of one-way clutch 20, middle transaxle device 16 and front transaxle device 4 can be drivingly synchronized with each other, thereby enabling front wheels 12 to be driven synchronously with middle wheels 26 and rear wheels 9.

Figure 7:
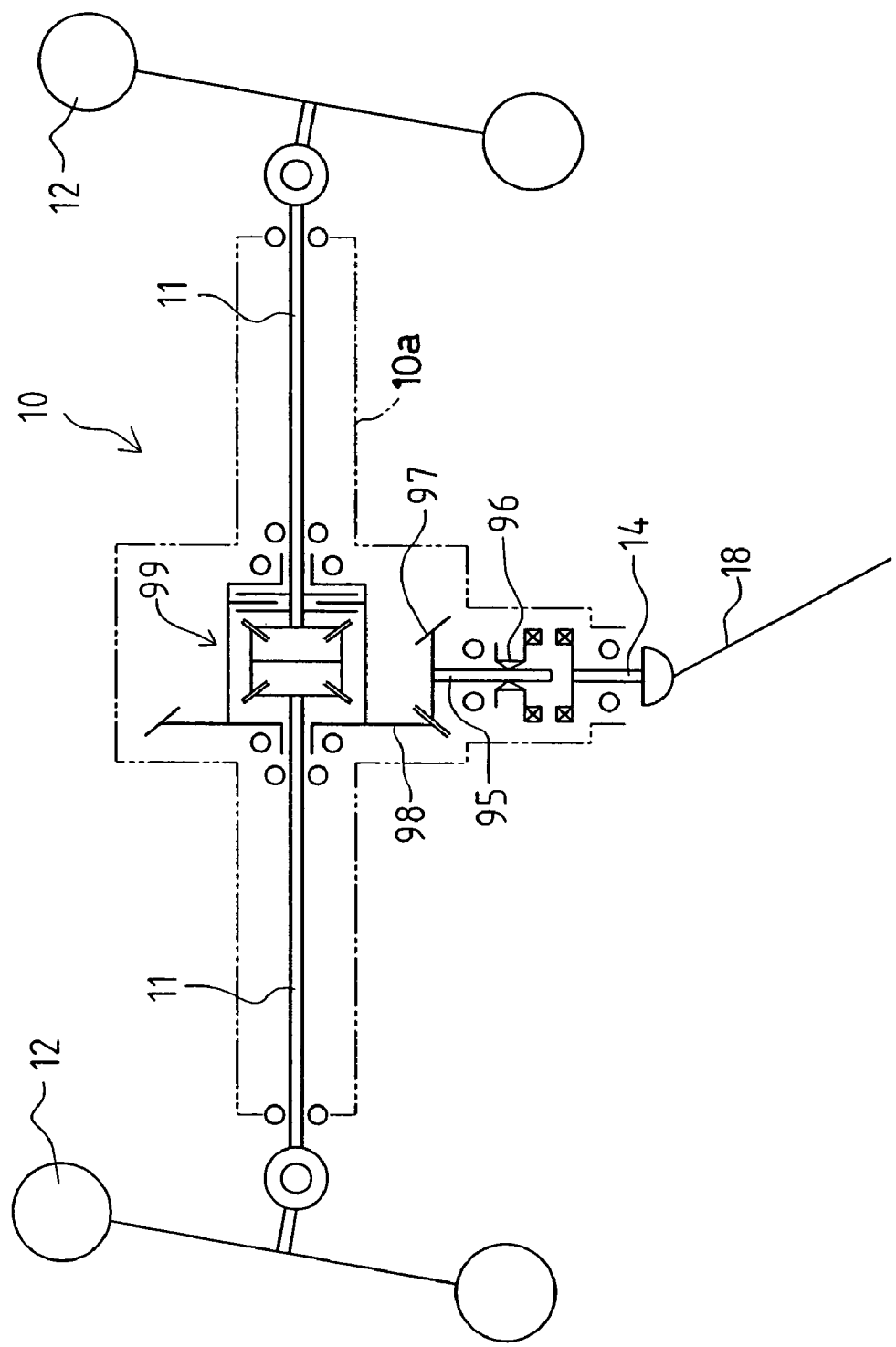
FIG. 7 is a schematic diagram of the front transaxle device of the same multi-wheel-driving vehicle.

With reference to FIG. 7, description will be given on front transaxle device 10. An input shaft 14 is disposed longitudinally of vehicle 1, rotatably supported by a front axle housing 10a, and projects backward so as to be connected to second PTO shaft 87 through a propeller shaft 18 and universal joints. In front axle housing 10a is a front clutch shaft 95 coaxially disposed with input shaft 14. A front clutch slider 96 is axially slidably disposed around front clutch shaft 95. A front clutch is constructed between the rear end of front clutch slider 96 and the front end of input shaft 14 so as to be engaged and disengaged by sliding of front clutch slider 96. Front clutch shaft 95 is fixedly provided at its front end with a bevel gear 97 so as to constantly engage with a bevel gear 98 serving as an input gear of a third-axle-differential 99 which differentially connects coaxial left and right front axles 11 with each other.

Third-axle-differential 99 is constructed almost similarly with main-axle-differential 32 of rear transaxle device 4 and second-axle-differential 89 of middle transaxle device 16. The main difference is that third-axle-differential 99 for front axles 11 is provided in its differential casing with multiple frictional discs, thereby serving as a multi-disc-type limited slip differential.

Description will now be given on a control system for brakes 22 and clutch sliders 88 and 96 in accordance with FIG. 8, wherein clutch sliders 88 and 96 are operated so as to effectively transmit the braking force generated by brakes 22 in rear transaxle device 4 to middle and front transaxle devices 16 and 10.

Brake pedal 19 is hydraulically connected to the pair of brakes 22 in rear transaxle device 4 through a hydraulic circuit 100 which comprises a master cylinder 101, an oil tank 102, an oil filter 103, a manual valve 104 and an oil passage 105. Oil is supplied from oil tank 102 into master cylinder 101 through oil filter 103 and valve 104. Oil passage 105 is extended from a discharge port of master cylinder 101 and branches to both brakes 22.

Master cylinder 101 is provided therein with a piston 107 and a spring 108 biasing piston 107 to the initial position. A piston rod 106 is fixedly extended from piston 107 opposite of the discharge port of master cylinder 101 so as to be connected to brake pedal 19. Brake pedal 19 is depressed so as to push piston 107 toward the discharge port of master cylinder 101 through piston rod 106 as much as the degree of depression of brake pedal 19, thereby discharging oil from master cylinder 101 into both brakes 22 through oil passage 105 and pressing the multi-discs of each brake 22 against one another so as to brake both rear axles 8. When brake pedal 19 is depressed beyond a predetermined degree, valve 104 is closed so as to stop oil supply into master cylinder 101, thereby preventing oil from back-flowing to oil tank 102 and ensuring the action of piston 107 according to depression of brake pedal 19. When brake pedal 19 is released from the depressing force applied thereon, piston 107 and brake pedal 19 are returned to their initial position by the biasing force of spring 108.

A switching sensor 48 is disposed adjacent to brake pedal 19 so as to be switched on by depression of brake pedal 19. Switching sensor 48 is electrically connected to a controller 30 for controlling the engaging and disengaging of the above-mentioned clutches.

A center clutch lever 121 is disposed beside a driver's seat of vehicle 1 for operating center clutch slider 88 disposed in middle transaxle device 16. A switching sensor 49 is disposed so as to be switched on when center clutch lever 121 is located at its clutch-on position. A front clutch lever 122 is also disposed beside the driver's seat for operating front clutch slider 96 disposed in front transaxle device 10. A switching sensor 50 is disposed so as to be switched on when front clutch lever 122 is located at its clutch-on position. Both switching sensors 49 and 50 are electrically connected to controller 30 so as to send signals about the positions of levers 121 and 122 to controller 30.

A hydraulic circuit 120 for sliding clutch sliders 88 and 96 comprises a hydraulic pump 110 driven by engine 3, an oil tank 111 for supplying oil to hydraulic pump 110, a pair of hydraulic cylinders 112 serving as a double actuator for sliding center clutch slider 88, a pair of hydraulic cylinders 113 serving as a double actuator for sliding front clutch slider 96, a solenoid valve 114 for hydraulically controlling cylinders 112, a solenoid valve 115 for hydraulically controlling cylinders 113, and a relief valve 116 for controlling the hydraulic pressure in hydraulic circuit 120.

Pistons of both cylinders 112 are fixed to each other and coupled with center clutch slider 88. Solenoid valve 114 is switched between two positions, in each position oil discharged from hydraulic pump 110 is supplied into one of cylinders 112 and simultaneously oil is drained from the other cylinder 112, thereby shifting center clutch slider 88 between a clutch-on position and a clutch-off position. The same is true for cylinders 113 and solenoid valve 115 regarding the front clutch comprising front clutch slider 96.

When brake pedal 19 is not depressed, switching sensor 48 is off, whereby solenoid valves 114 and 115 are controlled by controller 30 so as to locate each of clutch sliders 88 and 96 between its clutch-on position and its clutch-off position according to the positions of center clutch lever 121 and front clutch lever 122 which are detected by switching sensors 49 and 50. When brake pedal 19 is depressed, switching sensor 48 is switched on so that both solenoid valves 114 and 115 are controlled by controller 30 so as to forceably locate both clutch sliders 88 and 96 at their clutch-on positions regardless of the positions of levers 121 and 122.

Due to such a control system, when brakes 22 are operated for braking, the three transaxle devices 4, 16 and 10 are drivingly connected together so as to make the braking force applied onto rear axles 8 effectively transmitted to middle axles 25 and front axles 8, whereby all of the six wheels 9, 26 and 12 are braked, thereby shortening the braking distance of vehicle 1.

Alternatively, during the depression of brake pedal 19, only solenoid valve 114 may be forceably controlled for locating center clutch slider 88 to its clutch-on position so that rear wheels 9 and middle wheels 26, four wheels in total, are braked.

Figure 9:
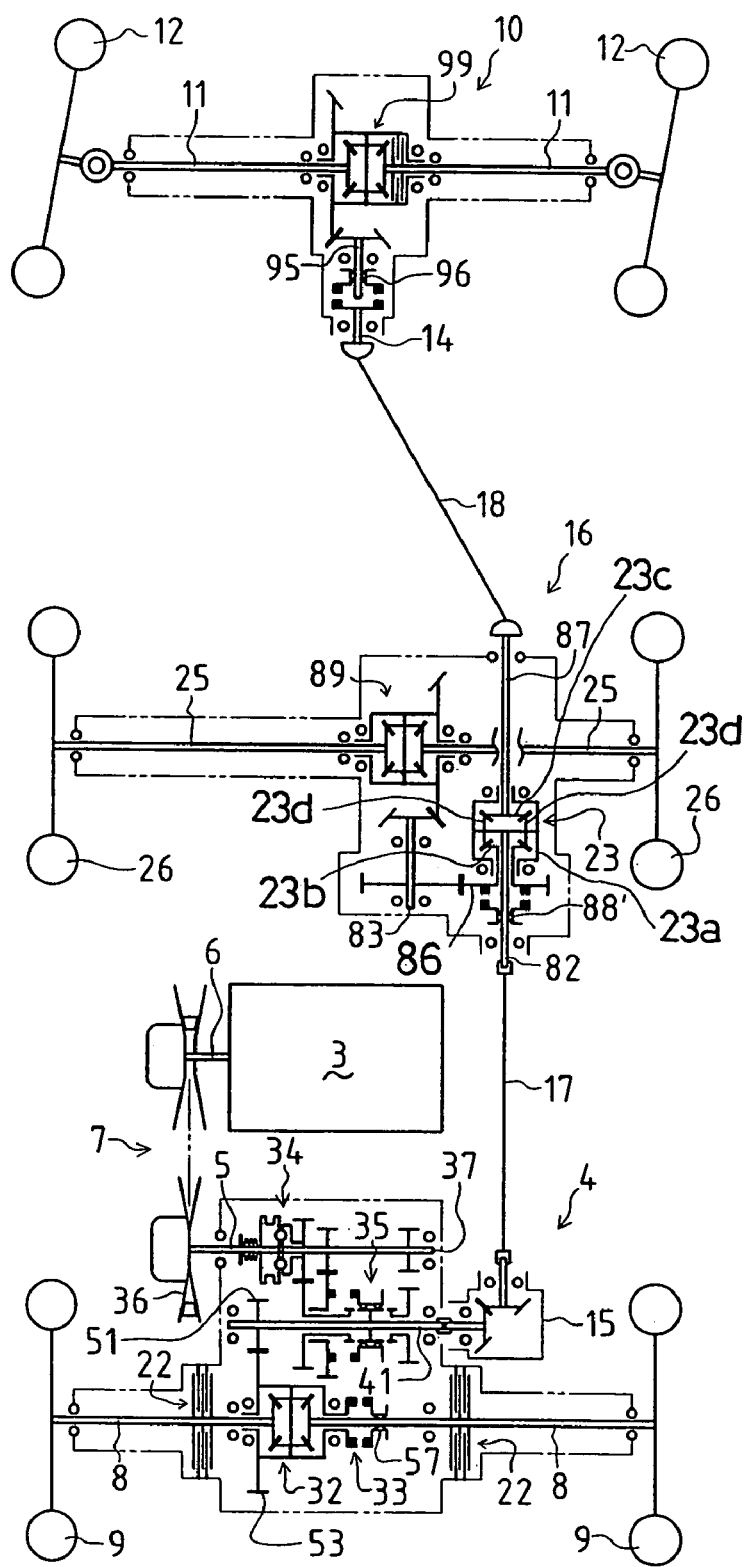
FIG. 9 is a schematic diagram of a driving transmission system of a multi-wheel-driving vehicle according to a second embodiment of the present invention.

Description will now be given on various driving transmission systems as modifications of the above-mentioned first preferred embodiment. Referring to a second embodiment shown in FIG. 9, instead of one-way clutch 20, a center differential 23 is interposed between input shaft 82 and second PTO shaft 87 in middle transaxle device 16 for sharing the torque transmitted from rear transaxle device 4 between front transaxle device 10 and middle transaxle device 16, thereby permitting a difference in rotary speed between front wheels 12 and middle wheels 26. Center differential 23 differentially connects both shafts 82 and 87 with each other. Input shaft 82 is inserted into a differential casing 23a of center differential 23 so as to make differential casing 23a integrally rotatable with input shaft 82. In differential casing 23a are disposed a pair of differential side gears 23b and 23c and a pair of differential pinions 23d.

Differential side gear 23b is rotatably provided around input shaft 82 and is formed integral with clutch gear 86 disposed outside differential casing 23a while differential side gear 23c is fixed to second PTO shaft 87. Differential pinions 23d are interposed between differential side gears 23b and 23c in typical form.

A center differential locking clutch slider 88' replacing center clutch slider 88 is axially slidably provided around input shaft 82. A center differential locking clutch is constructed between clutch gear 86 and center differential locking clutch slider 88' so as to be engaged and disengaged by sliding of center differential locking clutch slider 88'. When center differential locking clutch slider 88' is located so as to engage the center differential locking clutch, clutch gear 86 and input shaft 82 are joined together so as to drivingly synchronize middle transaxle device 16 and rear transaxle device 4 with each other, and also, center differential 23 is locked together with both shafts 82 and 87, whereby front transaxle device 10 is synchronously driven with middle and rear transaxle devices 16 and 4 if the front clutch is engaged.

When brake pedal 19 is depressed so as to switch on switching sensor 48, center differential locking clutch slider 88' and front clutch slider 96 are forceably located at their clutch-on positions for transmitting braking force applied on rear axles 8 to middle and front axles 25 and 11. Other undescribed parts of this second embodiment are similar with those of the first embodiment.

Figure 10:
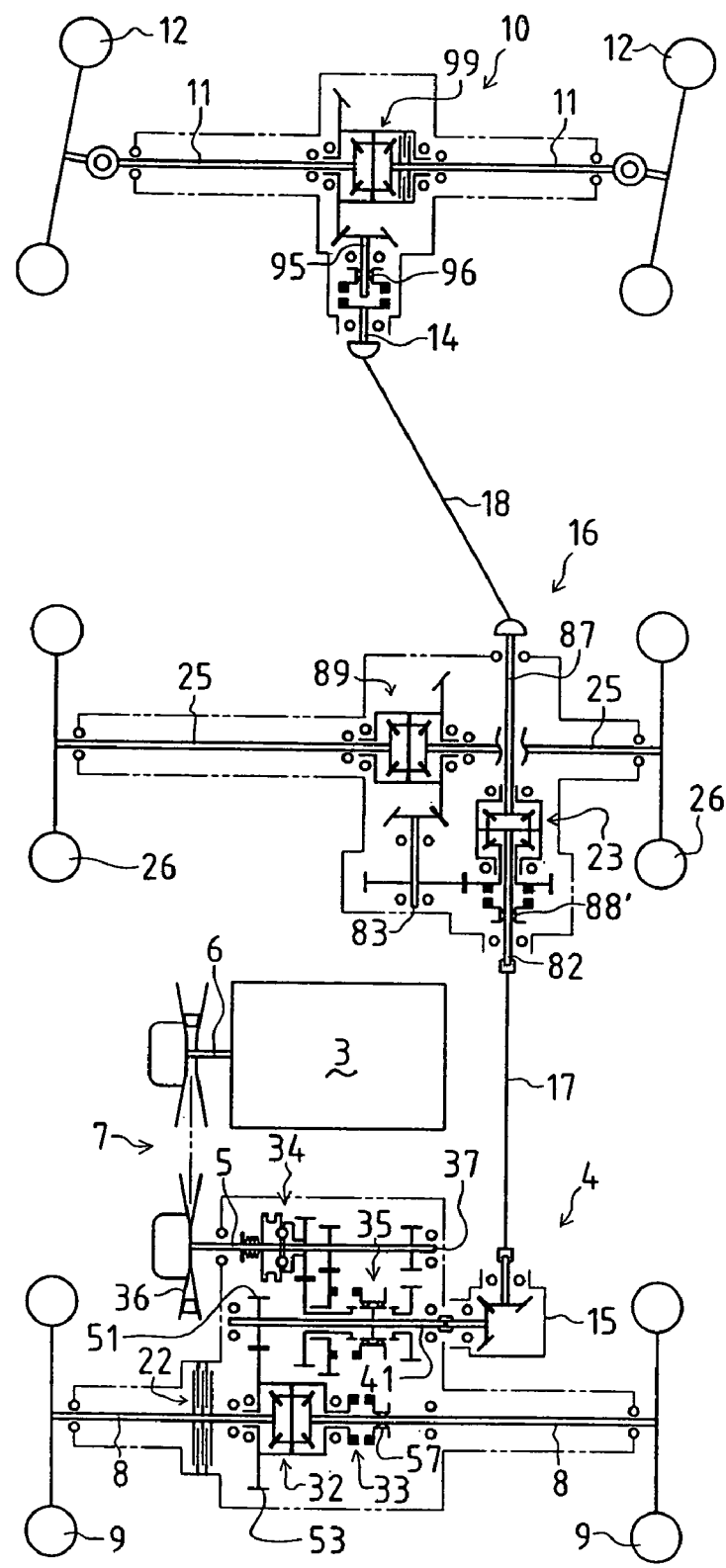
FIG. 10 is a schematic diagram of a driving transmission system of a multi-wheel-driving vehicle according to a third embodiment of the present invention.

Referring to a third embodiment shown in FIG. 10, center differential 23 and the center differential locking clutch are disposed in middle transaxle device 16 similar to the second embodiment. In rear transaxle device 4, only one brake 22 is disposed on one of left and right rear axles 8.

Figure 11:
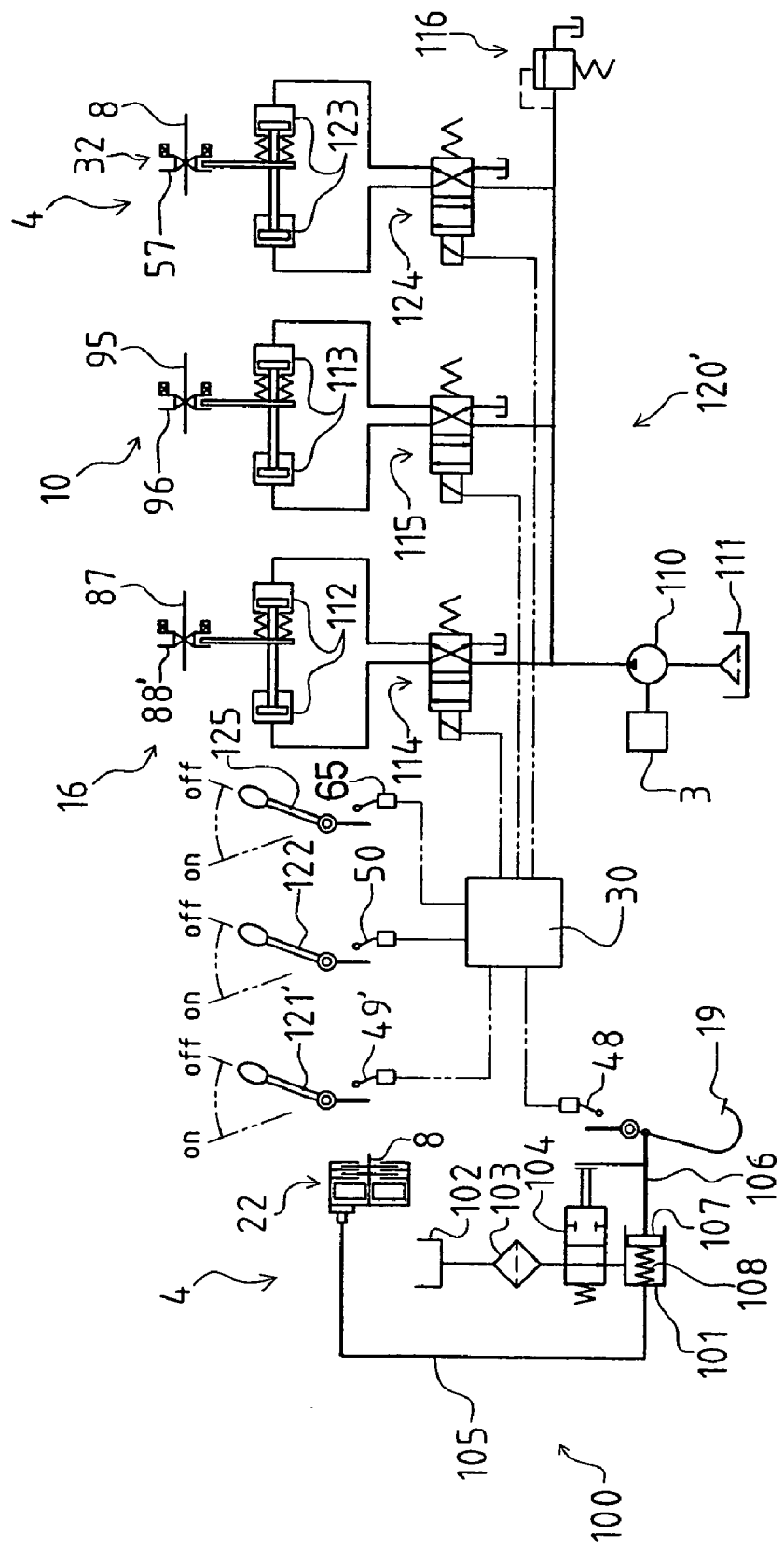
FIG. 11 is a hydraulic and electric circuit diagram of a control system for braking and differential-locking in the driving transmission system of the multi-wheel-driving vehicle according to the third embodiment.

The third embodiment employs a control system for operation of the front clutch and differential-locking of main-axle-differential 32 and center differential 23 as shown in FIG. 11, wherein the front clutch are engaged and main-axle-differential 32 and center differential 23 are differentially locked so as to effectively transmit the braking force generated by single brake 22 in rear transaxle device 4 to middle and front transaxle devices 16 and 10.

Beside the driver's seat of vehicle 1 are provided a center differential locking lever 121' replacing center clutch lever 121, and a main-axle-differential locking lever 125. Each of differential locking levers 121' and 125 is shiftable between its locking position and its unlocking position. A switching sensor 49' is provided so as to be switched on when center differential locking lever 121' is located at its locking position. A switching sensor 65 is provided so as to be switched on when main-axle-differential locking lever 125 is located at its locking position.

In a hydraulic circuit 120' for operating sliders 57, 88' and 96, the pair of hydraulic cylinders 112 are provided for sliding center differential locking clutch slider 88' between its locking and unlocking positions, and solenoid valve 114 is provided for controlling oil-supplying and oil-draining of cylinders 112. Additionally, a pair of hydraulic cylinders 123 serve as a double actuator for sliding main-axle-differential locking slider 57 between its locking and unlocking positions. A solenoid valve 124, electrically connected to controller 30, is provided for controlling oil-supplying and oil-draining of cylinders 123. Other structures and parts are similar with those of hydraulic circuit 120 shown in FIG. 8.

Further, the controlling parts for main-axle-differential locking mechanism 33 such as main-axle-differential locking lever 125, hydraulic cylinders 123 and solenoid valve 124 are also provided in the control system of the first embodiment shown in FIG. 8. These features are omitted in FIG. 8 because they are irrelevant to the description of the clutch-controlling for effectively transmitting braking force to all wheels 9, 26 and 12 of vehicle 1.

In the third embodiment, the forced controlling of main-axle-differential locking mechanism 33 is required for transmitting the braking force of only one brake 22 to both rear axles 8. Therefore, in this embodiment, when brake pedal 19 is depressed, solenoid valves 114, 115 and 124 are controlled by controller 30 so as to forceably locate main-axle-differential locking slider 57, center differential locking clutch slider 88' and front clutch slider 96 at their locking or clutch-on positions. Thus, the braking force generated by only one brake 22 provided on one rear axle 8 can be effectively transmitted to the other rear axle 8 and also transmitted to both middle wheels 26 and both front wheels 12, thereby effectively stopping vehicle 1.

Four preferred embodiments shown in FIGS. 12 to 15, wherein middle axles 25 serves as main axles and rear axles 8 serves as second axles, have such a common structure as follows. Power of engine 3 is, first, transmitted to middle transaxle device 16 serving as a main transaxle device, and driving force is transmitted from middle transaxle device 16 to rear transaxle device 4 and front transaxle device 10. Speed-changing gear transmission 35, torque sensor 34, main-axle-differential 32 and main-axle-differential locking mechanism 33 are exchanged with second-axle-differential 89 between rear transaxle device 4 and middle transaxle device 16. Main-axle-differential 32 differentially connects coaxial left and right middle axles 25 with each other. Only one of middle axles 25 is provided thereon with brake 22. Second-axle-differential 89 differentially connects coaxial left and right rear axles 8 with each other. Rear transaxle device 4 is provided with a forwardly extended input shaft 13 which receives driving force transmitted from middle transaxle device 16.

In each of the embodiments shown in FIGS. 12 through 15 (except for that shown in FIG. 14), middle transaxle device 16 is provided on one outer side of its middle axle housing 16a, preferably in opposite to its input side, with a PTO casing 15' replacing PTO casing 15. A rear PTO shaft 82' is extended backward from PTO casing 15' so as to be universally joined to input shaft 13 of rear transaxle device 4 through propeller shaft 17. A front PTO shaft 87' is extended forward from PTO casing 15' so as to be universally joined to input shaft 14 of front transaxle device 10 through propeller shaft 18.

Figure 12:
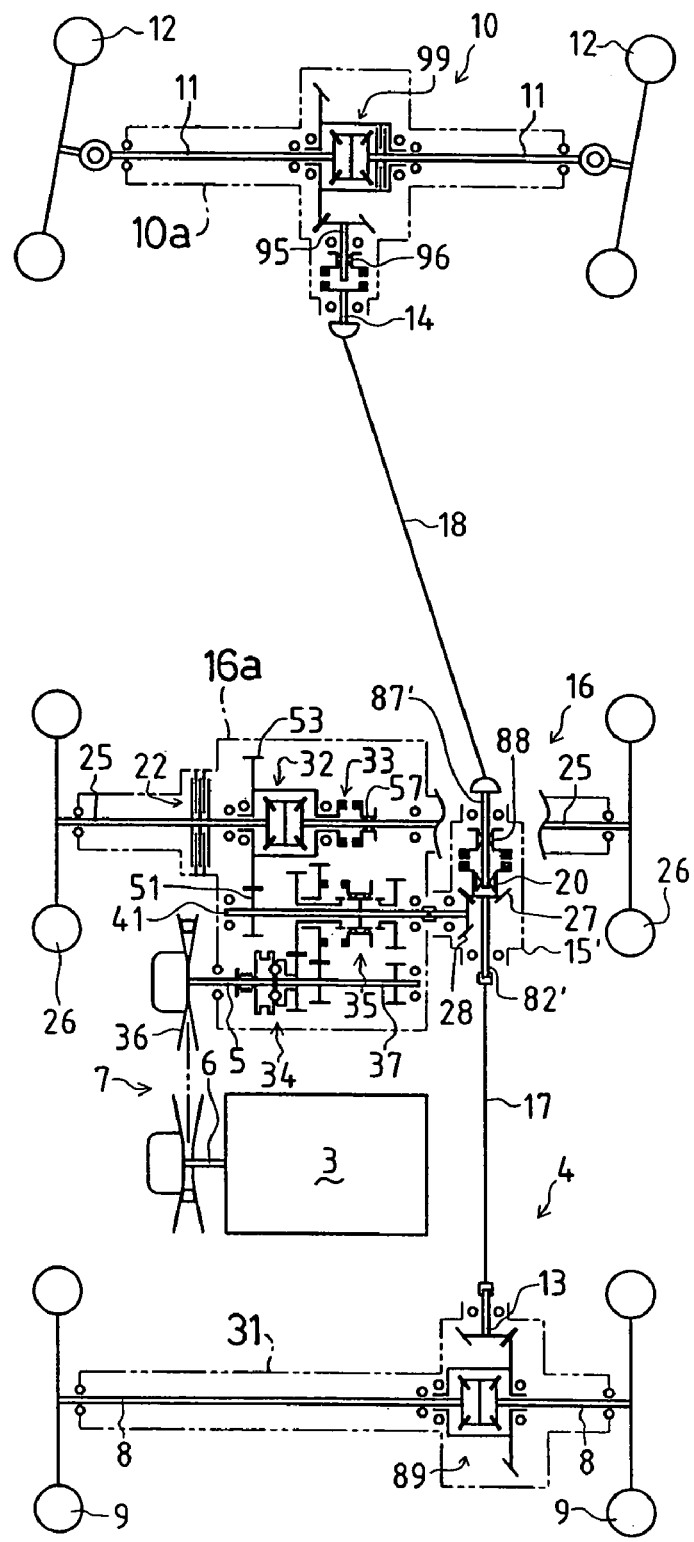
FIG. 12 is a schematic diagram of a driving transmission system of a multi-wheel-driving vehicle according to a fourth embodiment of the present invention.

Referring to a fourth embodiment shown in FIG. 12, counter shaft 41 (or extension shaft 61 coaxially extended from counter shaft 41) projects into PTO casing 15'. In PTO casing 15', a bevel gear 28 fixed to counter shaft 41 constantly engages with a bevel gear 27 fixed to rear PTO shaft 82'. Rear PTO shaft 82' and front PTO shaft 87' are disposed coaxially with each other. One-way clutch 20 is interposed between rear PTO shaft 82' and front PTO shaft 87', thereby permitting a difference of rotary speed therebetween. Center clutch slider 88 is axially slidably disposed around front PTO shaft 87'. A center clutch is constructed between center clutch slider 88 and bevel gear 27 fixed to rear PTO shaft 82'.

In this embodiment, due to such a structure, rear transaxle device 4 is constantly drivingly connected with middle transaxle device 16. When the center clutch is engaged while the front clutch in front transaxle casing 10 is engaged, front transaxle device 10 is also synchronously driven with middle and rear transaxle devices 16 and 4.

The fourth embodiment employs a similar control system as shown in FIG. 8 so that, when brake pedal 19 is depressed, both the center clutch including center clutch slider 88 and the front clutch including front clutch slider 96 are forceably engaged for effectively transmitting braking force from one middle axle 25 serving as a main axle to rear axles 8 serving as second axles and front axles 11 serving as steering axles. However, for effectively braking all wheels of vehicle 1, in addition to that shown in FIG. 8, main-axle-differential locking slider 57 is required to be forceably slidden so as to lock main-axle-differential 32 as shown in FIG. 11.

Figure 13:
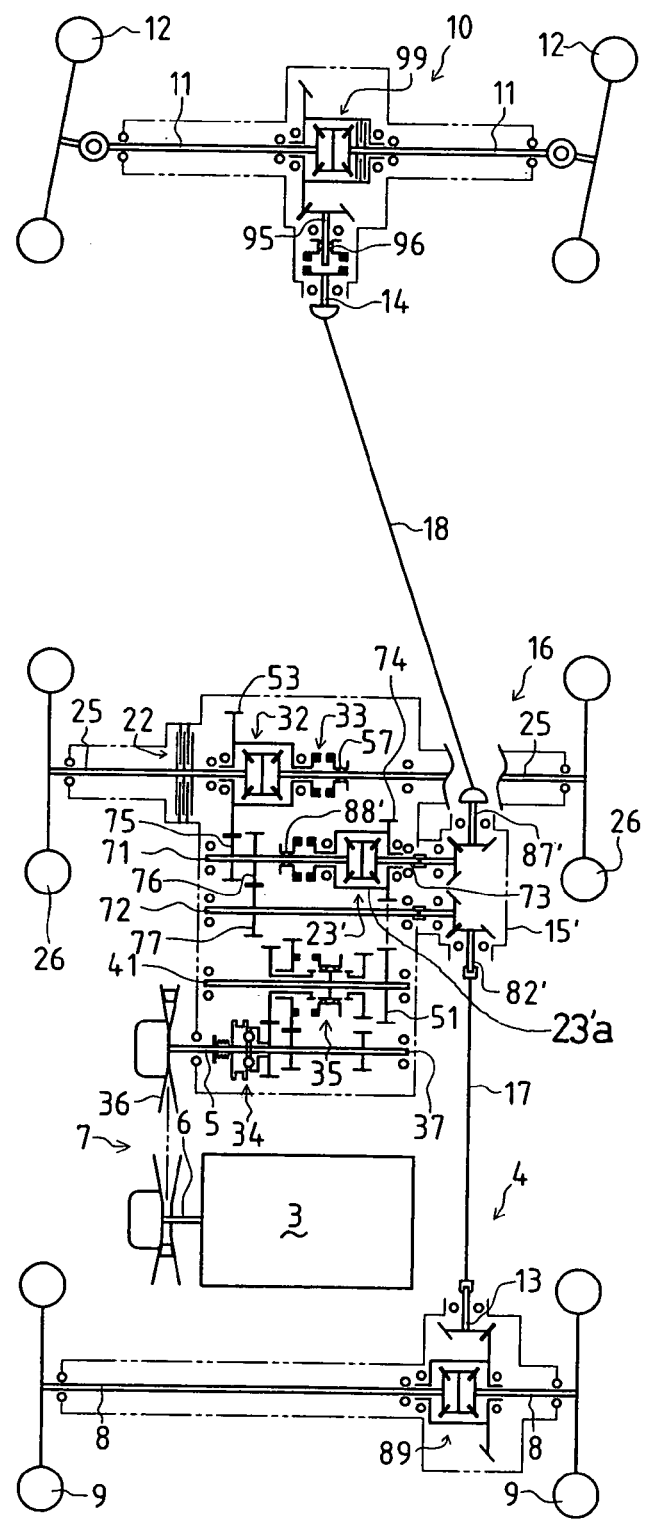
FIG. 13 is a schematic diagram of a driving transmission system of a multi-wheel-driving vehicle according to a fifth embodiment of the present invention.

Referring to a fifth embodiment shown in FIG. 13, in middle axle housing 16a of middle transaxle device 16, a second counter shaft 71 and a third counter shaft 72 are disposed parallel to counter shaft 41 and middle axles 25. Third counter shaft 72 is extended into PTO casing 15' so as to engage with rear PTO shaft 82' through bevel gears. A differential output shaft 73 is disposed coaxially with second counter shaft 71 and extended into PTO casing 15' so as to engage with front PTO shaft 87' through bevel gears.

In middle axle housing 16a, center differential 23' is interposed between second counter shaft 71 and differential output shaft 73 so as to differentially connecting both shafts 71 and 73 with each other. Output gear 51, fixedly provided on counter shaft 41, constantly engages with a ring gear 74 of center differential 23' so that the torque of counter shaft 41 is transmitted to center differential 23' and shared between second counter shaft 71 and differential output shaft 73.

Center differential locking clutch slider 88' is axially slidably disposed around second counter shaft 71 so as to engage with and disengage from a differential casing 23'a of center differential 23'. When center differential locking clutch slider 88' is slidden to engage with differential casing 23'a, center differential 23' is locked so as to lock second counter shaft 71 and differential output shaft 73 together.

A middle-axle-drive gear 75 fixed on second counter shaft 71 constantly engages with ring gear 53 of main-axle-differential 32 differentially connecting middle axles 25 with each other. A first rear-axle-drive gear 76 fixed on second counter shaft 71 constantly engages with a second rear-axle-drive gear 77 fixed on third counter shaft 72, thereby driving second-axle-differential 89 differentially connecting rear axles 8 with each other. As a result, a part of the torque of counter shaft 41 shared by center differential 23' is transmitted to middle axles 25 and rear axles 8, and the remainder is transmitted to front axles 11 (while the front clutch is engaged).

The fifth embodiment employs a similar control system as shown in FIG. 11 so that, when brake pedal 19 is depressed, the front clutch including front clutch slider 96 is engaged and both center differential 23' and main-axle-differential 32 are locked for effectively applying braking force to all wheels 9, 26 and 12 of vehicle 1. In this embodiment, the main axle provided thereon with brake 22 is not necessarily driven prior to center differenitial 23' for braking all wheels 9, 26 and 12 because all axle-differentials 32, 89 and 99 are synchronously driven and connected together by the locking of center differential 23' during braking.

Figure 14:
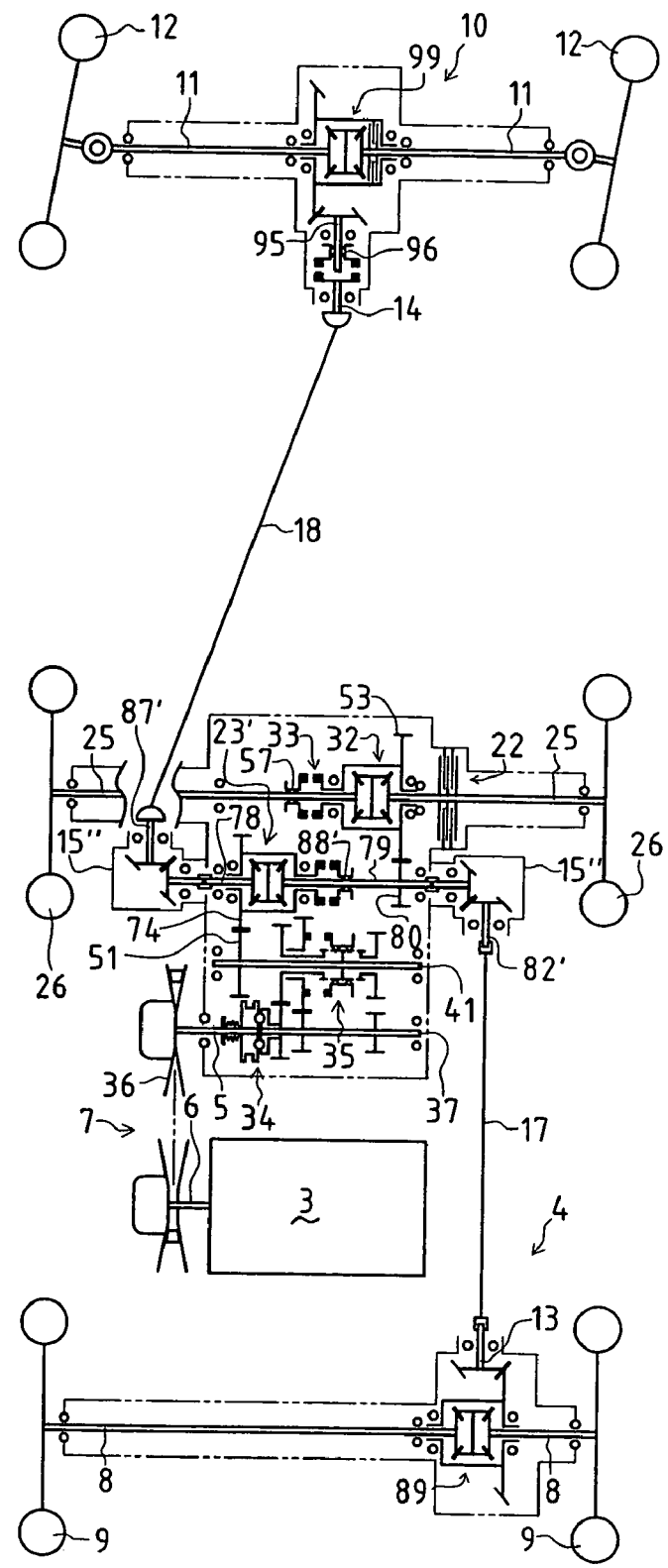
FIG. 14 is a schematic diagram of a driving transmission system of a multi-wheel-driving vehicle according to a sixth embodiment of the present invention.

Referring to a sixth embodiment shown in FIG. 14, a pair of PTO casings 15" are fixedly provided on middle axle housing 16a, preferably on opposite outer sides thereof. One PTO casing 15" supports rear PTO shaft 82' extending backward, and the other supports front PTO shaft 87' extending forward. Instead of shafts 71, 72 and 73, middle transaxle device 16 of this embodiment is provided with coaxial first and second differential output shafts 78 and 79. Center differential 23' is interposed between shafts 78 and 79, and ring gear 74 of center differential 23' constantly engages with gear 51 fixed on counter shaft 41.

First differential output shaft 78 is extended into one of PTO casings 15" so as to engage with front PTO shaft 87' though bevel gears. Second differential output shaft 79 is extended into the other of PTO casings 15" so as to engage with rear PTO shaft 82' through bevel gears. A gear 80 is fixed on second differential output shaft 79 so as to constantly engage with ring gear 53 of main-axle-differential 32 differentially connecting middle axles 25 with each other.

Therefore, similarly with the fifth embodiment, center differential 23' distributively transmits a part of the torque of counter shaft 41 to front axles 11 through first differential output shaft 78 and the remainder to middle and rear axles 25 and 8 through second differential output shaft 79.

The sixth embodiment also employs the similar control system shown in FIG. 11 so that, when brake pedal 19 is depressed, the front clutch including front clutch slider 96 is engaged and both center differential 23' and main-axle-differential 32 are locked for effectively applying braking force to all wheels 9, 26 and 12 of vehicle 1.

Figure 15:
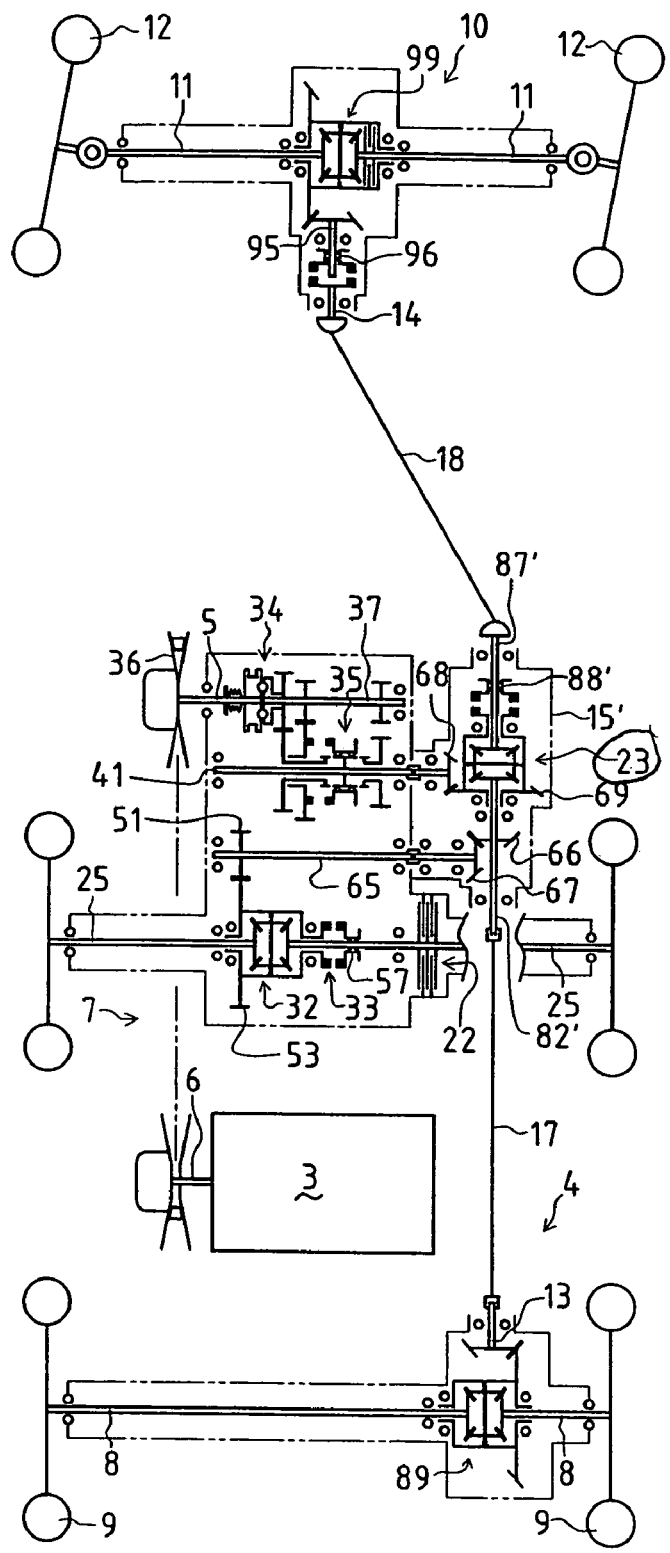
FIG. 15 is a schematic diagram of a driving transmission system of a multi-wheel-driving vehicle according to a seventh embodiment of the present invention.

Referring to a seventh embodiment shown in FIG. 15, middle transaxle device 16 is provided at its one outer side with one PTO casing 15' in which rear PTO shaft 82' and front PTO shaft 87' are disposed coaxially with each other. In PTO casing 15', center differential 23 is interposed between rear PTO shaft 82' and front PTO shaft 87' so as to differentially connecting both shafts 82' and 87' with each other.

In middle axle housing 16*a*, a second counter shaft 65 is disposed parallel to counter shaft 41. Output gear 51 is fixed on second counter shaft 65 so as to constantly engage with ring gear 53 of main-axle-differential 32. Counter shaft 41 and second counter shaft 65 are extended into PTO casing 15'. In PTO casing 15', a bevel gear 68 fixed on counter shaft 41 constantly engages with a bevel ring gear 69 fixed to differential casing 23*a* of center differential 23. Center differential locking clutch slider 88' is axially slidably disposed around front PTO shaft 87' so as to engage with and disengage from differential casing 23*a*. Thus, center differential 23 distributively transmits a part of the torque of counter shaft 41 to front axles 11 through front PTO shaft 87' and the remainder to middle and rear axles 25 and 8 through rear PTO shaft 82'.

The seventh embodiment also employs the similar control system shown in FIG. 11 so that, when brake pedal 19 is depressed, the front clutch including front clutch slider 96 is engaged and both center differential 23 and main-axle-differential 32 are locked for effectively applying braking force to all wheels 9, 26 and 12 of vehicle 1.

Alternatively, in each of the fourth to seventh embodiments, both middle axles 25 may be provided thereon with respective brakes 22. In this case, similarly with the first and second embodiments, the forced locking of main-axle-differential 32 for effectively transmitting braking force to both middle axles 25 is unnecessary when brake pedal 15 is depressed.

In each of the first to seventh embodiments, brake 22 may be alternatively provided on a member such as counter shaft 41 prior to main-axle-differential 32 or center differential 23 or 23'. In this case, main-axle-differential 32, when braking, is not necessarily locked, however, it is preferably locked for effectively applying the braking force onto both the main axles.

For further or other embodiments of the present invention than the above mentioned embodiments shown in the drawings, main differential 23 may be disposed in front transaxle device 10 so as to receive power from engine 3 prior to middle and rear transaxle devices 16 and 4. In this case, input means of middle and rear transaxle devices 16 and 4 may synchronously interlock with the primary side of one-way clutch 20, and front (steering) axle 11 may synchronously interlock with the secondary side of one-way clutch 20. Alternatively, input means of middle and rear transaxle devices 16 and 4 may synchronously interlock with one of differential side gears 23*d* of center differential 23, and front (steering) axle 11 may synchronously interlock with the other differential side gear 23*d*.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A six-wheel working vehicle, comprising:
   an engine;
   a pair of steerable first wheels disposed at one of front and rear portions of the vehicle;
   a first transaxle supporting and driving the pair of first wheels;
   a pair of unsteerable second wheels disposed between the front and rear portions of the vehicle;
   a second transaxle supporting and driving the pair of second wheels;
   a pair of unsteerable third wheels disposed at the other rear or front portion of the vehicle;
   a third transaxle supporting and driving the pair of third wheels;
   a belt type continuous variable transmission disposed on one of left and right sides of the vehicle, the belt type continuous variable transmission being drivingly interposed between the engine and the third transaxle; and
   a PTO mechanism disposed on the other right or left side of the vehicle so as to transmit power from the third transaxle to the first and second transaxles, wherein the PTO mechanism includes a differential gear unit for differentially distributing power between the first and second transaxles.

2. The six-wheel working vehicle according to claim 1, wherein the differential gear unit is disposed in the second transaxle.

3. The six-wheel working vehicle according to claim 1, further comprising:
   a first clutch interposed between the differential gear unit and the first transaxle; and
   a second clutch interposed between the differential gear unit and the second transaxle.

4. The six-wheel working vehicle according to claim 3, wherein the second clutch is disposed in the second transaxle.

* * * * *